United States Patent [19]
Lemelson

[11] 3,710,078
[45] Jan. 9, 1973

[54] DOCUMENT SCANNING APPARATUS AND METHOD

[76] Inventor: Jerome H. Lemelson, 85 Rector Street, Metuchen, N.J. 08840

[22] Filed: Jan. 11, 1971

[21] Appl. No.: 105,236

Related U.S. Application Data

[63] Continuation-in-part of Ser. No. 622,650, March 13, 1967, Pat. No. 3,555,246, which is a continuation-in-part of Ser. No. 337,617, Jan. 14, 1964, Pat. No. 3,309,669, which is a continuation-in-part of Ser. No. 806,398, March 12, 1969, abandoned.

[52] U.S. Cl. ....................................235/61.11 E, 340/174.1 C, 179, 100.2 MI
[51] Int. Cl. ...............................................G06r 7/10
[58] Field of Search.................235/61.11 E, 61.11 R; 340/146.3 D, 174.1 C; 250/219 D; 179/100.2 MI, 2 DP

[56] References Cited

UNITED STATES PATENTS

| | | | |
|---|---|---|---|
| 2,261,542 | 11/1941 | Dickinson et al. | 235/61.11 E |
| 3,229,073 | 1/1966 | Macken et al. | 235/61.11 E |
| 2,986,725 | 5/1961 | Dirks | 340/174.1 C |
| 3,238,501 | 3/1966 | Mak et al. | 235/61.11 E |

*Primary Examiner*—Thomas A. Robinson

[57] ABSTRACT

A scanning apparatus for reading and generating electrical signals of recordings provided on a sheet containing parallel lines or tracks of said recordings. The scanning transducer is operable to be moved in a plurality of directions with respect to a document which is driven to preposition it with respect to the transducer control of the operation of the transducer is effected by scanning marks or signals recorded on the document, generating electrical signals upon detecting such recordings and thereafter initiating or terminating the scanning function which is preceded by the termination or initiation of the operation of the card driving means.

9 Claims, 6 Drawing Figures

INVENTOR
Jerome H. Lemelson
BY

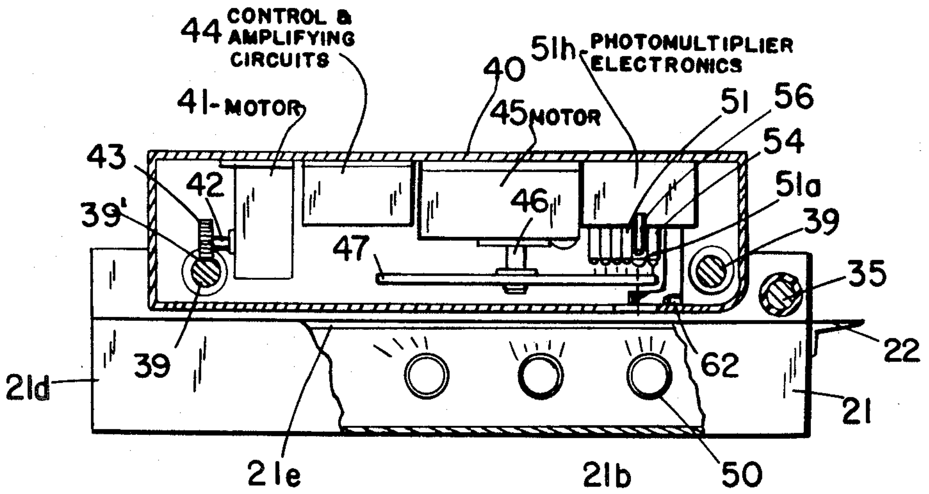
FIG. 2
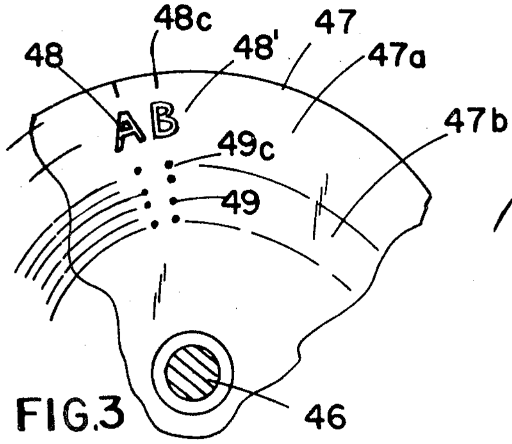
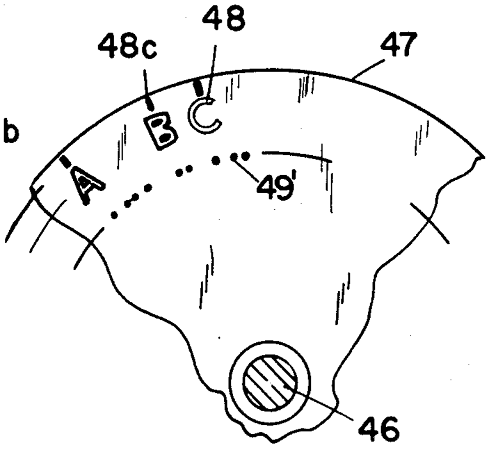
FIG. 4
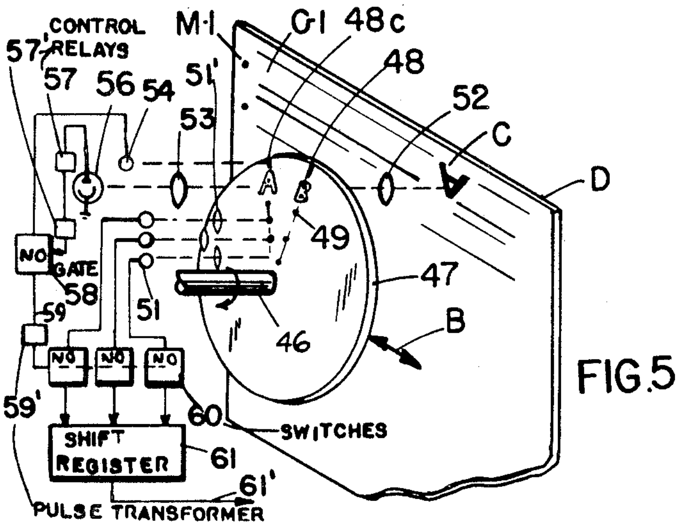
INVENTOR.
Jerome H. Lemelson

INVENTOR.
JEROME H. LEMELSON

DOCUMENT SCANNING APPARATUS AND METHOD

CROSS REFERENCE TO RELATED APPLICATIONS

This is a continuation-in-part of application Ser. No. 622,650 filed Mar. 13, 1967, for Document Reading Apparatus, now U. S. Pat. No. 3,555,246 which was a continuation-in-part of Ser. No. 337,617 filed Jan. 14, 1964, now U.S. Pat. No. 3,309,669, a continuation in part of Ser. No. 806,398 filed Mar. 12, 1969, for Information Reading Apparatus and Method, now abandoned.

SUMMARY OF THE INVENTION

This invention relates to an electro-mechanical device which is operable to read information recorded on flat sheet material such as cards or sheets of paper. The recordings are preferably disposed along parallel band areas or tracks of the record member as groups of alpha-numeric characters such as words or number, printed groups of codes, magnetic recordings in pulse of analog form or other types of recordings. A line of information may also be provided as cutouts in a card. The transducer for reading the lines of recordings may comprise a photoelectric cell, magnetic pickup head, switches or other means activated by the recordings as the transducer is moved parallel to each line selected for reproduction. Means are provided for guiding a sheet or card along a receiving platen or entrance slot to the reading apparatus and roller drive means are operable to receive the leading edge of the card and to drive the card into the reading apparatus so that it may be prepositioned for automatic scanning thereafter. A unique feature of the invention is the provision of means for detecting either the leading edge of the card and/or the positioning mark or otherwise provided control signal recording which is predeterminately disposed in a longitudinal direction to effect stoppage of the card predeterminately within the reader. A recording or mark is also provided in a predetermined longitudinal location along the card to be detected by a pickup or reading head operable to generate a control signal which is thereafter utilized to initiate or control one or more functions including the driving of the card out of the scanning apparatus.

The apparatus of the instant invention thus includes means for driving a card into a scanning device, detecting the card and prepositioning it within the device, thereafter initiating a scanning operation and, after detecting an end-of-scanning signal, terminating the scanning operation and initiating means for driving the card out of the housing.

It is therefore a primary object of this invention to provide a new and improved apparatus for scanning information recorded on flat cards and sheets and converting the scanned information to electrical signals representative thereof for computing, control and recording purposes.

Another object is to provide a new and improved document reading apparatus containing means for reading selected of a plurality of lines of recorded information provided on individual cards or sheets.

Another object is to provide a reading apparatus for information recorded on cards wherein a control recording is provided on each card for effecting control of the reading operation and wherein the reading of said control recording generates a control signal which is applied to effect control of the apparatus and eventual removal of the card from the reading apparatus.

Another object is to provide a card or document reading apparatus having a plurality of record tracks and means for controlling the selective reading of information provided on selected tracks of the document.

Another object is to provide a new and improved data conversion apparatus for generating binary codes of alpha-numeric information recorded on a card and readily presentable to computers, data processing facilities and the like.

Another object is to provide an automatically operable line reading apparatus which has a minimum number of components and is therefore substantially simpler and lower in cost to produce than conventional electro-optical readers.

Another object of the instant invention is to provide scanning means for use in computers, data processors and the like comprising means for sequentially scanning lines of data line-by-line and automatically converting information so scanned into binary coded representations thereof.

Another object of the instant invention is to provide means for scanning recorded data comprising means for receiving data carrying card means, automatically stepping said card line-by-line after completion of sequential scanning of each line.

Another object of the instant invention is to provide means for converting alpha-numerically present data into binary coded representations thereof by means of a scanning means which is movable across a card record member and is automatically controlled in its operation for scanning the recordings in a card and converting said recordings scanned into binary coded representation thereof.

These and other objects of the instant invention will become apparent when reading the accompanying description and drawings in which:

FIG. 2 is a side view of the scanning device of FIG. 1 with portions of the scanning means housing removed to expose the interior construction.

FIGS. 3 and 4 are plan views showing portions of the scanning disc means of FIG. 2 to aid in the description of the instant invention.

FIG. 1 is an isometric view of an electro-mechanical scanning device 20 employing the principles of the invention. The scanning apparatus comprises a base 21 which supports means for aligning and driving a document to be read into a reading position, means for scanning the document and means for removing the document once scanned.

Figure 1:
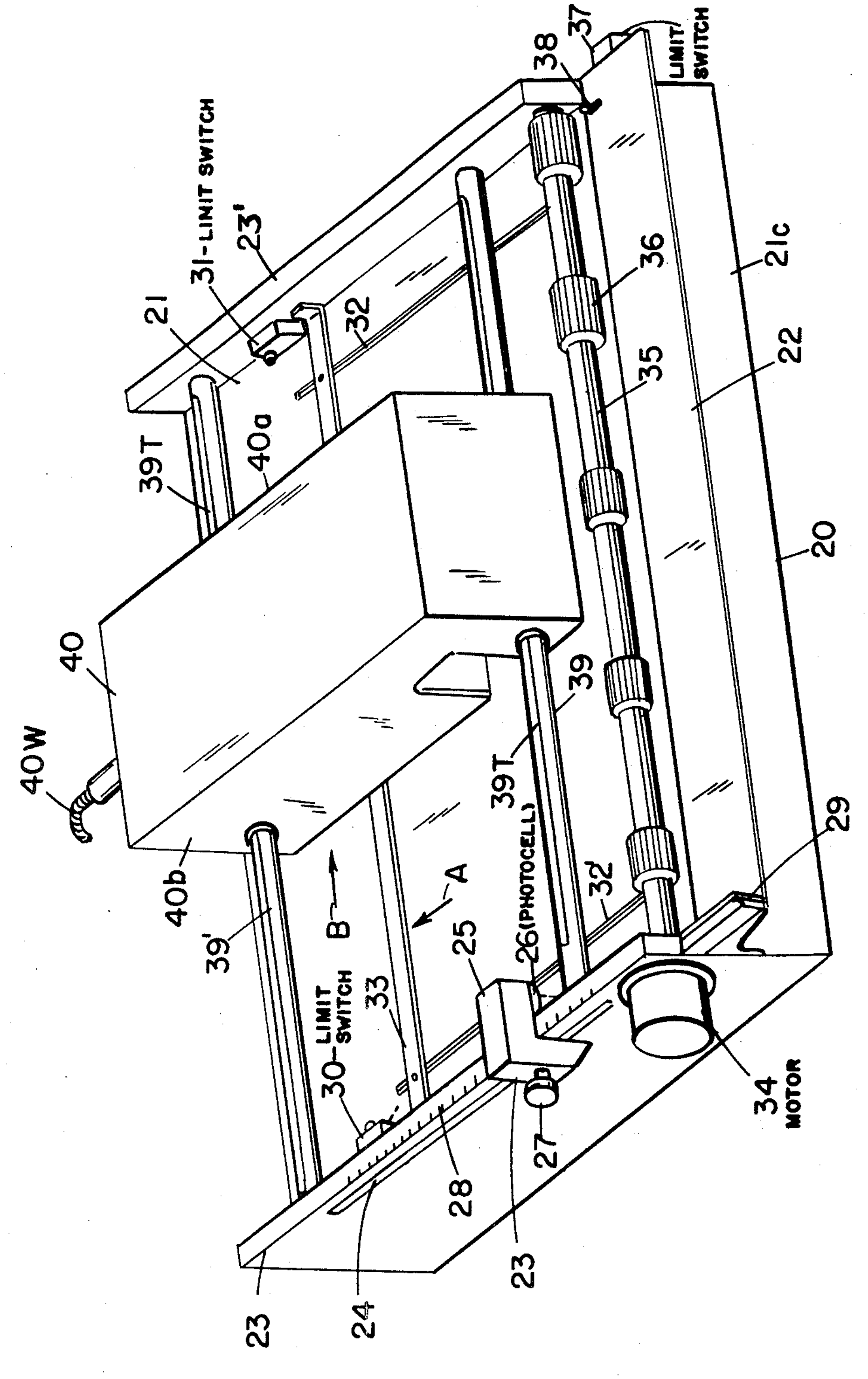
FIG. 1 is a perspective view of a scanning device designed in accordance with the principles of the instant invention.

The base 21 supports a platform 22 designed to receive the document from a conveyor, chute or other transfer means (not shown). The platform 22 projects from one end of the base and is supported on brackets 29 by the front wall **21*c* of 21. The platform 22 also supports a limit switch 37 having an actuator arm 38 positioned to be deflected by a document fed to the platform and operative to start a servo for driving the document through the device. Notations 23 and 23' refer to parallel projecting portions of the side walls of the base 21 which serve to support various components including two rod-like elements 39 and 39' which define tracks for a housing 40, a shaft 35 operative to drive documents into reading position and a scanning device 25 to be described. The shaft 35 is supported for rotation by suitable bearings secured by the side walls 22 and 23. A plurality of cylindrical rollers 36 are secured to shaft 35 and are adapted to engage the upper surface of a document, fed thereto, against the upper surface of base 21 and to drive said document along 21 into reading position when gear-motor 34 to which shaft 35** is coupled, operates.

The document scanning device which includes a rotating disc and an electro-optical scanning system, is provided within housing 40 which is self propelled and movable laterally across the base 21 in a path defined by track members 39 and 39', is operative to scan in a fixed path or band area which is parallel to the track members 39 and 39'. Therefore, the position of the document on the surface of 21 or the degree it has been driven in the direction A until stopped for scanning will determine that portion or line of the document to be scanned. Positioning the document for scanning is effected, in one mode of operation, by the means of a photoelectric cell 26 provided on a mount 25 which is adapted to be adjustably located along the edge of the wall 23 so as to vary the location of the scanning axis of cell 26. The photoelectric detector 26 is operative to scan and detect either the leading edge of the document or a mark or other means indicative of the position of the last entry on the card or line to be read and provides a signal upon sensing said marks, which signal is operative to stop motor 34 and start the motor driving the housing 40 to effect the initiation of scanning the selected lateral row of characters or line of the document. Adjustment of the position of mount 25 is effected by means of a locking arrangement including a knurled head screw 27 cooperating with a nut, now shown, which is carried in a slotted hole 24 in wall 23, the combination being operative to lock base 25 in a selected of a plurality of positions along 23 which positions are indicated by marks 28 on the upper surface of 23. The marks 28 are so calibrated as to indicate where to position base 25 for effecting the stoppage of motor 34 to preposition the document for scanning respective lateral band areas or selected line entries of the document.

The reader housing 40 is movable along tracks 39 and 39' between limits defined by the side walls 22 and 23 and movement of the housing in one direction is operative to effect the completion of scanning of one line of characters extending across the document. The housing 40 is driven by a motor 41 illustrated in FIG. 2 as being mounted within and supported by the walls of the housing 40 and having a drive shaft 42 supporting a toothed drive wheel 43 which engages teeth formed in a channel 39T provided longitudinally along track member 39. While the operation of gear motor 41 is initiated as a result of the signal generated by the scanner 26, the motor 41 is reversed to return 40 to its starting position when the actuator of a limit switch 31 positioned on wall 22 to engage the side wall 40a of 40 is activated. The switch 31 is operatively connected to the necessary reversing control for motor 41 which is located within housing 40 through a flexible cable 40W secured to said housing and sufficiently slack to move therewith. A second limit switch 30 supported by wall 23 is operative to stop motor 41 when the housing returns to the homing position adjacent wall 23. The actuator of 30 is activated when the housing side wall 40b moves thereagainst.

Further details of the scanner 20 illustrated in FIGS. 2 to 5 and include a sub-housing 44 mounted within housing 40, which contains various control and amplifying circuits to be described, a constant speed motor drive unit 45 for a scanning disc 47 secured to the drive shaft 46 of 45 and a bank 51 of photo-multiplier cells positioned to scan a portion of the scanning disc 47. Document illuminating lamps 50 are mounted in base 21 and/or housing 40. In a preferred form of the invention, although not necessarily the only scanning means applicable to the apparatus hereinabove described, character scanning is effected by the provision of areas or of windows 48 around the disc, which areas are shaped to the contours of the adjacent areas 48' are opaque and mask light directed against the particular annular band area 47A of disk 47 containing the characters 48 so defined. Disposed radially inward of each character 48 is an array of spot areas in the form of respective codes 49 which are scannable by the bank of photomultiplier devices 51, some of which have been omitted from FIG. 5 for purposes of simplicity. Thus, each character window 48 is identifiable by a particular code 49 which code, when the corresponding window 48 matches the character being read, is generated to provide a parallel code on a circuit, which code is indicative of the character so identified. Also shown in FIG. 2 are a plurality of lamps 50 secured within base 21 for directly passing light through the document being read to provide images of the characters thereof in the electro-optical scanning system, although reflex lighting means mounted within housing 40 may be employed to illuminate the upper surface of the document.

In FIG. 4, a code 49' associated with each disc character window 48 is provided along a particular circular path of the disc having as its center, the axis of rotation of said disc. In this embodiment, only one scanning cell need be employed and the code generated is in series rather than the parallel form provided in FIG. 3.

Notation 48C refers to scannable marks or light transmitting lines, there being one such line provided radially aligned with each disc character 48 for locating said character and the code associated therewith to perform the function described hereafter.

The basic mode of operation of the electro-optical scanning system is illustrated in FIG. 5, which shows a document D being scanned, disc 47 which rotates at constant speed and preferably in the range of several thousand revolutions per minute or more and a plurality of elements 51 to 56 comprising the electro-optical systems and elements 57 to 60 comprising a portion of the signal generating and gating system.

The method of scanning and detecting particular alpha-numeric characters of the printed line being scanned, illustrated in FIG. 5, is based on the principle that, if the line to be scanned is substantially aligned with the optical system of the scanner, represented by lenses 52 and 53, the shapes of light transmitting windows 48 are substantially similar in contour and size as the images of respective scanned characters projected on the surface of band area 47A of the disc 47, the disc 47 is traversed along a path such as indicated by arrow B parallel to the line of characters being read, and said disc is rotated at a high enough speed, than at least once during each complete rotation of the disc a condition will exist where minimum or zero light will pass to a reading photoelectric cell 56 adapted to receive only that light passed through the disc character windows 48. When such a condition of minimum light-passage to the cell 56 exists, a relay or control circuit 57 which is operatively connected to the output of the photoelectric device 56 is operative to generate a signal on its output when a minimum current or no current appears on its input from 56, and said signal generated thereby is passed to the switching input of a normally open electronic gate 58 having an input from photoelectric scanner 54 which is operative to scan the light transmitting disc-character location marks or apertures 48C. Thus, when signals are simultaneously generated on the outputs of scanner 54 and control circuit 57, the output 59 of normally open gate 58 is energized by the signal passed to its input from photocell 54 receiving light passed through character market aperture 48C, which signal is utilized to gate the code signals generated as read by the bank of photomultiplier devices 51. Each photomultiplier tube or device 51 is connected to a respective normally open monostable electronic gate of a bank 60 of such gates denoted 60–1, 60–2 . . . 60–N), the switching inputs of each of which are connected to a respective output of a pulse transformer 59' having line 59 as its input. The multiple outputs of 59' become simultaneously energized when a pulse appears in line 59 from gate 58 and all of the normally open switches 60' simultaneously close for a duration to pass the signals generated by those photomultiplier devices 51a which are energized in scanning marks or light passed through holes 49 in the opaque disc 47. In other words, the code 49C which is radially aligned with the particular character being scanned by the photomultiplier bank 51, is passed through the temporarily opened switches of bank 60 and is either recorded as a parallel binary bit code by connection of the outputs of said switches to respective recording transducers or is passed to a shift register 61 for converting said code to a series code prior to recording or otherwise utilizing it.

In other word, the code 49C which is radially aligned with the particular character being scanned by the photomultiplier bank 51, is passed through the temporarily closed switches of bank 60 and is either recorded as a parallel binary bit code by connection of the outputs of said switches to respective recording transducers or is passed to a shift register 61 for converting said code to a series code prior to recording or otherwise utilizing said code appearing on the output 61' of the shift register.

Figure 5A:
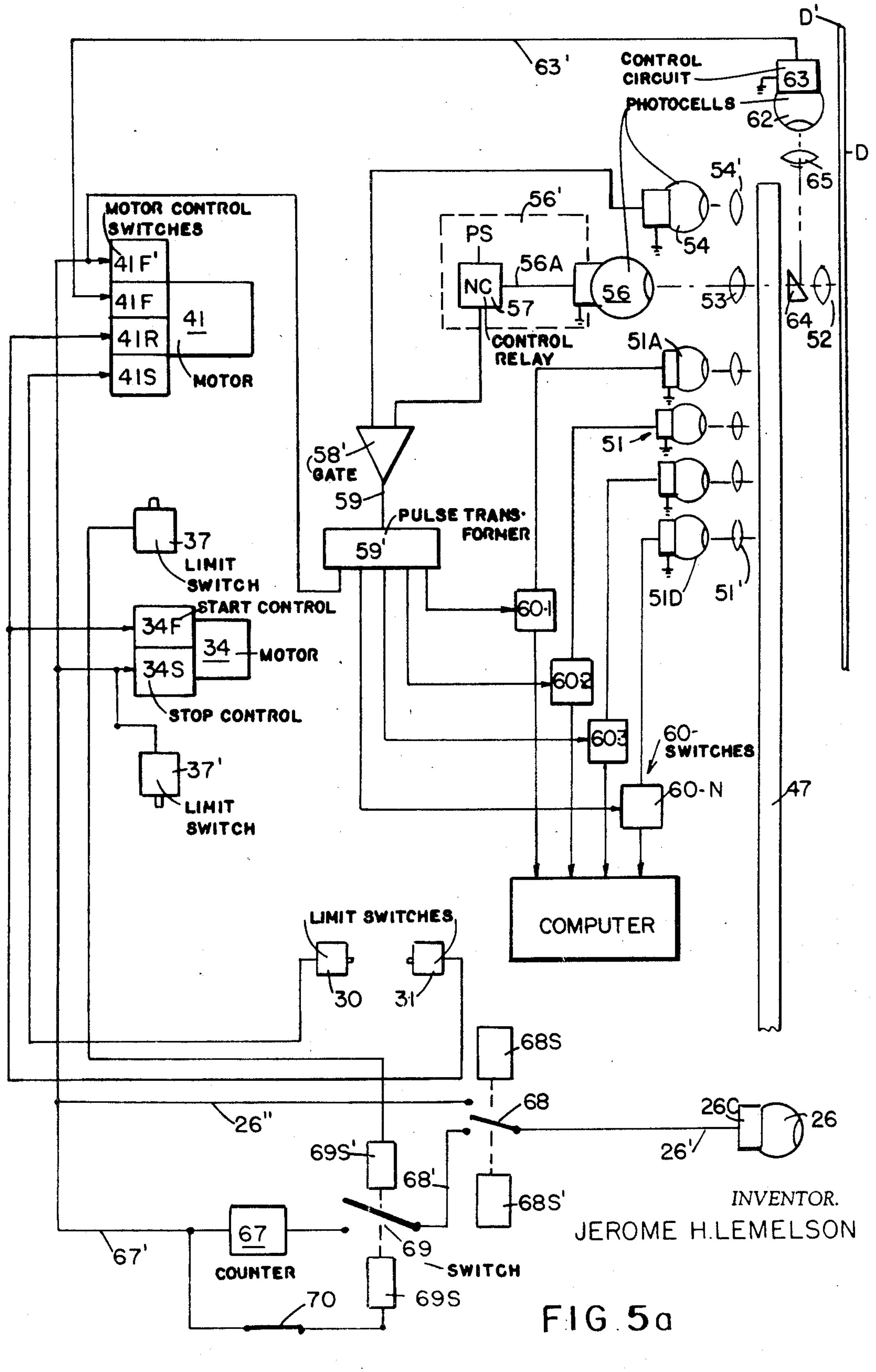
FIG. 5 is a partial perspective and partial block diagram showing the scanning means of FIGS. 1 through 4 in greater detail, and FIG. **5*a*** is a schematic diagram showing further aspects of control of the scanner.

FIG. 5a illustrates an adjustable automatic control system applicable to the apparatus of FIGS. 1 to 5.

The scanning apparatus of FIG. 5*a* is adjustable to perform one of the following scanning cycles for reading one or more lines of characters provided on a plurality of documents or cards fed consecutively thereto, the selection of which control cycle to employ will depend on the scanning requirements of the particular group of documents fed thereto. Various scanning cycles may be classified as follows:

I. Scan just one line of alpha-numeric characters on a document. This may comprise:

A. The only line of characters prepositioned on a card,

B. The last line of characters entered on a document which document may comprise a bill, for example, with a new accounting entered periodically such as monthly as a row or line of characters so that the monthly entry on each document will appear on the same line as the others, C. One line of characters appearing at the same line locations on all documents, but not necessarily the last line of characters on the document.

II. Scan multiple lines of characters on the document. These may comprise:

A. All lines on a multi-line document,

B. A preselected number of lines including the last line to be entered,

C. Random numbers of consecutive lines of characters including the last line, where different documents may have a random number of entries made as the last number of entries (i.e. no two documents need have the same number of last entries or last consecutive number of lines to be read).

D. Any random lines of a document which may, though need not all, be consecutive or include the last line of characters entered.

In the control apparatus provided in FIG. 5*a*, for the purpose of simplifying the diagram, it is assumed that power supplies for the various components such as switching devices, relays counters, solenoids, motors, controls and the like are provided correctly in circuit therewith where not illustrated.

Describing now the control means of the apparatus of FIG. 5*a* which is applied to effect the various modes of scanning briefly mentioned above:

(IA) — Scanning the only line of characters entered on a document such as a card is effected by feeding the document to platform 22 which trips arm 38 of limit switch 37 which pulses the start control 34F of motor 34 rotating shaft 35 to drive the card through the reader. Card edge scanner photocell 26 detects a notch or mark M printed along the left edge of the card card aligned or prepositioned with respect to the line or characters to be read. The control 26C for the photocell 26 is adapted by conventional means to generate a pulse either when detecting the leading edge of the card or when a character line indicating mark M is aligned with the optical system of the photocell, which pulse is passed to the stop control 34S for motor 34 which stops the feed of the document or card to position it with said single line of characters aligned with the optical system of the character reading multiplier type photocell 56. Which of the two phenomena is used to activate the cell 26 will depend on adjustments in the cell controls. For example, if the cell control 26C is operative to generate a control pulse upon detecting the leading edge of the card, a light source mounted beneath the card is employed and masking said light by means of the card is operative to activate photocell controller 26C to generate a pulse or signal by conventional means. Conventional electronic means in controller 26C may also be used to generate a pulse on output 26' when a black mark along the left border of the card is aligned with the optical system for the cell 26.

With switch 68 connecting lines 26' and 26'', the pulse output of 26C is passed to the start control 41F' of motor 41 causing housing 40 to be driven at a first speed from home position adjacent wall 23 in the direction of arrow B. The motor 41 may be operated at one speed during scanning or at two speeds including a first fast speed while the optical system of scanner 56 approaches the first character of the line to be scanned and/or during traversing the distance between characters and a second slower speed than the first while each character is moving through the optical field of the scanner 56. Such dual speed movement of the scanner will reduce the total time required for scanning each line and will permit slower scanning of each character without requiring a substantially long period to scan across the entire width of the document.

Dual speed control is effected by means of another photoelectric cell 62 which is fixedly mounted within housing 40 and adapted to receive a portion of the image passed through the optical system for character scanning cell 56 before said light passes through disc 47. A half-silvered prism 64 placed behind lens 52 is operative to pass light of images of the characters being scanned to both cells 56 and 62. The optical system for cell 62 is represented by lens 65 and is preferably adapted to present a thin line image area of the surface of the document, the length of which image area is approximately the height of largest character of the line being scanned and which line is preferably a portion of the leading edge or leading portion of the image field of the scanner 56. When cell 62 receives total reflected light (i.e. — when there is no image of a character in its thin band field), cell control circuit 63 will not generate an output signal. However, as soon as the intensity of light passing to cell 62 drops below a predetermined level as caused by a portion of the image of a character entering said thin band scanning field of 62, control 63 is operative to generate a signal on its output 63' which is passed to the control 41F for motor 41 which is activated thereby to switch to slow operation and to drive scanner assembly 40 at a slow traversing rate which continues either until the image of the character being scanned has moved out of the image field of 62 so that no signal is generated on line 63' and motor control 41F' will become activated to revert to fast operation of motor 41 (assuming control 41F is a monostable switch which bypasses 41F'). In a more preferable mode of control, the output signal generated on line 59 when the character has been identified by scanner 56 is passed to motor control 41F' to revert to fast traverse.

The character scanning and identifying means of FIG. **5*a* is quite similar to that illustrated in FIG. 5. The output of character scanner cell or cells 56 is passed to a photoelectric control 56' which generates a signal on its output when zero or substantially little light is passed to the cell (i.e. when the cell scans the mask opaque areas or a character window 48 is substantially if not completely blocked of light by the image of a similarly shaped character focused thereon). The controller 56' includes a normally closed monostable electronic gate 57' having an input from a power supply PS and an output extending to one input of an AND circuit 58'. The output 56*a* of the cell 56 is energized with a signal when cell 56 receives light through windows 48 in disc 47 reflected from the document and said signal is used to open switch 57' so that no current passes to 58' from PS. However, when a character window 48 matches the character being scanned, output 56*a* is deenergized permitting switch 57' to close and passing current from power supply PS to gate 58'. When this occurs as the window character alignment mark or window line 48C is scanned by cell 54, an output is generated by the control cell 54 which is passed to AND circuit 58' generating a signal on its output 59 which is passed to a pulse transformer 59' having plural outputs extending to monostable normally open switches 60 which are connected in the outputs of the code scanning photomultiplier devices 51. The switches 60–1 to 60–N, thus closed, pass those signals generated when respective of the cells 51 scan respective marks or light transmitting code portions of disc 47 radially aligned with the window of the identified character. As stated, an output of transformer 59' is also connected to fast traverse control 41F' for motor 41**.

Upon completion of scanning the single line of characters, limit switch 31 is activated when the wall of housing 40 is driven against the actuator of the switch, whereby 31 generates a pulse signal which is passed to start control 34F of motor 34 driving the document completely out of the reader. The switch 31 may be slow-to-close and control 34F monostable such that motor 34 operates for a sufficient interval to remove the document from the scanning apparatus. However, a more preferred control means comprises use of a scanner 37' such as a limit switch or photoelectric relay operative to detect when the trailing edge of the document has passed out of the scanner to activate the stop control 34S of motor 34. This will permit manual adjustments to the control apparatus to effect the other modes of control as described.

(IB)— Scanning just the last line of characters on each document fed to the reader is effected as follows. A manually presettable, self-resetting counter 67 is connectable to the output 26' of the photoelectric control 26C by closing manual switches 68 and 69. The counter 67 receives pulses generated when cell 26 scans character line position indicating marks M along the longitudinal border of the document and may be preset to generate a control pulse on its output 67' upon receipt of a predetermined number of line indicating pulses. The output 67' of counter 67 extends to stop control 34S of motor 34 and start control 41F' of motor 41. The present count at which counter 67 generates a pulse may be made such that the line scanned is the last line of all documents containing characters. The counter 67 may also be replaced by a presettable, self-recycling timer-relay adapted to generate a control signal which is passed to 34S and 41F' at a time after receiving a pulse generated when 26 detects the leading edge D' of the document such that the card comes to rest with a predetermined lateral band area or line of character aligned with the scanning field of scanner 56.

If marks M are provided adjacent locations all along the length of the document, the input from photoelectric control 26C to counter 67 may be deactivated until the next document is fed to the scanner by passing the control signal output of counter 67 to activate a solenoid 69S which opens a switch 69 between counter 67 and 26C so that 67 will remain deenergized until the next document enters the scanner whereupon the output of switch 37 energizes a second solenoid 69S' closing switch 69. Switch 70 between counter 67 and 69S may be manually opened permitting counter 67 to receive all pulses generated by 26C.

Further variations in the apparatus of FIGS. 1 – 5*a* are noted. Using substantially the same means illustrated for positioning and driving a document and for traversing a scanning character identifying means, the rotating disc 47 may be replaced by other movable character window containing means such as (a) a closed loop, flexible film strip or metal belt containing cutouts the shape of the characters to be read and driven in a closed loop path around a plurality of pulleys supported by a frame which also supports the scanning cells, (b) a drum having peripheral character windows arranged in a closed loop on its cylindrical surface, (c) a plate having a row of character windows having the shape of the characters to be read and movable with said row of windows moved parallel to and in alignment with the line of characters to be read. In the latter arrangement, the character scanning photocell moves parallel to the row of windows as the plate is oscillated many times back and forth cross the line to be read.

In another modification, the character shaped windows or light transmitting windows 48 may be replaced by character identifying means in the form of a plurality of group of plural small holes or light transmitting windows, with the holes of each group adapted to indicate the identification of a character when the image thereof falling onto the disc or base containing the holes is operative to provide no reflected light passing through any of the holes in the group. Such a condition may be photo-electrically detected during an interval when, for example, a scanner such as mark scanner 54 scans a character position indicating mark 48C to generate an output signal as described and utilizable to read code marks as described.

As stated, if it is desired to scan the first line of characters on a document or the only line provided thereon, bi-stable manual switch 68 is thrown to connect circuits 26' and 26''. Notations 68S and 68S' refer to solenoids which are each remotely operative for respectively throwing bi-stable switch 68 to either its condition where the output of cell 26 is passed directly to controls 34S and 41F' or to counter 67. To scan any predetermined lateral band area of the document or line of characters, switch 68 is thrown to its other condition connecting circuits 26' and 68' and switch 69 is closed. The counter relay or timer 67 is then preset to generate a control signal on its output 67' upon receipt of any predetermined number of pulses from marker scanner 26 or at a predetermined time interval after 26 scans the leading edge of the document. If device 67 is a counter and is present to generate a control pulse on its output upon receipt of each pulse on its input (i.e. set for one count), then each line of the document will be read in a stepping fashion. If marks M are printed in alignment with each row of characters and terminate with the last row of characters, then after reading the last row, the document will be driven out of the reader upon energization of limit switch 31 since no further signal will be generated on line 67' to stop motor 34 after 26 has scanned the last line indicating mark.

By replacing or by-passing counter 67 with a programming device such as a multi-circuit timer or a programmable counter, it will be possible to scan any selected number of character rows on a document. Such a programmable counter may comprise a stepping motor coupled to a shaft having a plurality of cams or pins set at different angles to each other. The shaft is step-rotated equal angles each time a pulse is generated by line mark scanner 26. The preset cams are operative to close and open respective switches all connected to generate pulses on line 67' when different lines of characters are aligned with scanner 56.

To read the last line of a plurality of lines, the number of which may vary from document to document, scanner 26 may be positioned to scan mark locations one or more lines ahead of scanner 56. Upon detecting a condition where no mark is present (i.e. — where the lines of characters terminate) the scanner control 26*c* may be operative to generate a signal on its output 26' which when connected to circuit 26'' effects scanning said last line of characters.

It is thus seen that by adjusting and actuating the various switch and control means of FIG. 5a, various modes of scanning operations, as described, as possible to account for varying scanning functions according to the requirements for reading. If the documents are designed whereby the character line locating marks M may be provided at different distances from the left border or edge of the documents, such as in different columns provided adjacent said border, and the position of the scanning axis of the mark scanning cell 26 may be laterally adjusted along mount or arm 25 so as to locate said cell to scan the particular column or longitudinal strip area of each document, then a further mode of control is derived in which one or more random lines of characters of each document may be automatically scanned as determined by those character line marks appearing in the column being scanned. In other words, if documents are used which do not necessarily contain the same number of lines of characters and without any particular requirement for scanning all documents, then any selected line or lines of each document may be automatically read as described by providing marks adjacent those lines to be read and in the particular lateral band area or column being scanned by cell 26 which controls positioning of the character scanner. For such a scanning function, switch 68 would be thrown to connect circuits 26' and 26''. Such a mark or marks may be provided when one or more character line entries are made by typing or by means of manual means such as a pencil or pen. As an example, for a document requiring one or more monthly entries which must be read, 12 such scanner-mark columns may be provided and the machine will operate to read any number of entries made during the month by providing marks M adjacent said entries all in the proper column to be scanned by 26, which cell is laterally positioned and set by manual means at such a calibrated location along the arm 27 of mount 23 so as to scan the selected column of marks M which indicate those lines of characters to be read. Marks appearing in all other columns, such as provided during previous entries, will therefore not affect reading functions associated with the last entry or entries.

It is noted that the scanning components of the apparatus of FIGS. 1 – 5 may be subject to degrees of variation. For example, scanning of the selected line of characters may be effected by disc aperture means dividing each character into segments which are analyzed and automatically recognized by computational means as shown in U. S. Pat. Nos. 2,663,758, 2,897,481 and 2,978,590.

Also, the servo motor 33 utilized for driving the document may be controlled by an input means interlocked to the operation of limit switch 31 to step the document one line distance at a time for scanning selected lines.

Other variations in the apparatus of FIGS. 1 and 5*a* include the following:

The housing 40 containing the scanning and comparator apparatus may be movable in a plurality of directions in addition to back and forth along tracks 39 and 39'. For example, tracks 39 and 39' may be mounted on a carriage movable back and forth in the direction of arrow A or longitudinally with respect to the document positioning means or base 20. Such movement and the automatic control thereof as described may be used to read columns of characters such as numeric characters entered in a ledger without the need for controlling motor 34 to effect said action although motor 34 may be so controlled to read columns of characters by either providing limit switches 30 and 31 positionably adjustable at different lateral locations along the upper surface of base 20 so as to limit the movement of housing 40 to permit scanning one or more selected columns of characters in a series of sweeps across the character or characters appearing in each line of the column between stepping movements from line to line controlled as described hereinabove. If opaque lines or marks define the lateral limits of each column then photoelectric cell scanning means such as cell 26 may be positioned, however, to scan and define the left and right limits of travel of the housing 40 for scanning one or more columns of a document by generating control signals when said cell scans said opaque lines or column defining marks and utilizing said control signals to perform the functions of the signals generated by limit switches 30 and 31. Such an auxiliary scanning cell used to replace limit switches 30 and 31 is preferably mounted within housing 20 and adapted to receive light from the spacing above or below the line of characters to be scanned so that the images of the characters will not activate the photoelectric relay. Also, the output of the photocell relay is preferably connected to an adjustable counter such as 67 to permit variable adjustment of the number of columns of characters read during a single lateral sweep of the housing 40.

In still another embodiment, the character shaped windows 48 may be replaced by photoconductive material provided in either substantially the same contour of the characters being scanned or masked to present said contours to receive light imaged thereon by suitable optical means scanning each character as the scanner housing moves rightwardly. When minimum or no light falls on the photoconductive character shaped cells provided on the disc, the electrical emission therefrom is minimized or drops to zero and by connecting each photoconductive character in circuit with a respective code generating means or means for generating character codes as described and using the reduction in electrical output thereof effective when the image of a character and photoconductive element match to gate or generate the code as described, the function of reading and identifying characters is accomplished.

Means other than that illustrated in FIG. 1 may be employed for prepositioning documents relative to the scanner housing 40. For example, cards or documents may be fed onto a drum and retained thereagainst by air pressure. The drum may be stopped in rotation or continuously rotated while the scanner is properly conveyed relative thereto for scanning characters line by line or a selected line of characters. Gravity may also be employed to feed cards, containing one or more lines to be read, into alignment with housing 40 prior to scanning while one or more adjustable stops effect alignment of the card whereby the line of characters to be read are prepositioned relative to the reader scanner. Retraction of the stops to permit removal of the card by gravity by means of a solenoid actuated by the signal generated when limit switch 31 becomes activated, may be provided to control card movement and the feeding of a new card to be read thereby.

In other forms of the invention, the described rotating disc scanning means may be modified to provide other types of electro-optical scanning or may be replaced by other means for scanning and reading documents or cards which have been prepositioned as described. For example, the rotating disc 47 may be replaced by an endless flexible belt containing character mask means a described, the flexible belt extending across the document at least the length of the lines of characters to be read and driven in a path so that all mask character apertures 48 thereof scan past each character of the line of the document being read while a bank of photoelectric cells equivalent to 51, 54 and 54 of the embodiment described is driven within the loop of said belt in the direction of the line of characters to effect the reading thereof. The lateral movement of the photoelectric cells, which may be mounted on an arm or carriage supported between the loop of belt, is controlled with respect to the speed of the belt such that the belt will completely cycle past each document character of the line being scanned while the scanning cells are substantially aligned with the character at least to a degree to permit the described detection of the character being read. In this connection, a photoelectric detection means may be provided to sense the leading edge of each character being read and operative to effect the slowing down or stoppage of the means conveying the reading photocells in the vicinity of each character if necessary to effect the described type of reading.

In another form of the invention, the described rotating reading disc arrangement may be replaced by a bank of photoelectric cells such as photomultiplier devices or tubes operative to photo-optically scan different levels of the line of characters being read as the mount and housing 40 therefore is driven as described across the document. The outputs of said photoelectric cells may be fed to a computer for analysis and determination of characters being read in code form by means of matrix matching, stroke analysis or other means. Analog waveform matching may also be employed for recognition of characters by employing a single photoelectric cell receiving light from a slit extending lateral to the direction of the line of characters and conveyed along the selected character line by means such as a housing 40 , drive and guide means as described which is controlled as described.

If lines of information are recorded as cutouts in a card, automatic reading thereof may be effected by means of the apparatus described modified to support a plurality of feeler switches, electric contacts or brushes or other means on the housing 40 so as to be swept across the selected line of information and generate electrical output signals as the housing is driven across the document.

The card or document being read may also contain magnetic recordings provided in a magnetic oxide coating on the surface of the card or in the form of magnetic ink printed characters. A reproduction and/or receiving scanner transducer may be mounted within housing 40 per se or in combination with other similar scanners adapted to be projected by servo motor or solenoid means against the selected recording track of the card or sheet after it has been prepositioned as described just prior to movement of the housing 40 from the home position in the direction B in the act of scanning a selected line as described.

I claim:

1. A document reading apparatus comprising:

a support including means for prepositioning a document containing information recorded on a plurality of tracks on the document's surface, reading means operable to sense the recordings of documents disposed on said support and to transduce the information scanned thereby to representative electrical signals.

means for selectively relatively moving a document and said reading means to permit scanning of the recordings of a document by said reading means, means for driving documents across said support, and means for relative stepping said document and said transducing means each time a track of recorded information has been read to bring the reading means and the next line of recorded information into operative relationship with each other, first means operative to control said driving means so as to predeterminately locate a document on said support prior to the main reading operation, second means for controlling said document driving means to drive a document, after it has been read, out of operative relationship with said scanning means, each of said documents having a control recording aligned with a selected track of information, transducing means for scanning said control recording and generating a control signal, means connected to said transducing means and responsive to the signal generated when said transducing means scans said control recording for controlling said second control means to drive said document to move the document out of operative relationship with said reading means after the last track to be read has been scanned by said reading means.

2. A document reading apparatus in accordance with claim 1 including means for adjustably positioning said transducing means on said support for reading control recordings at different locations on said support.

3. Apparatus in accordance with claim 1, wherein said transducing means includes a transducer operable for scanning control recordings recorded at different locations on different documents, means for relatively moving said transducer and a document supported on said base to permit said transducer to scan the control recording and generate said control signal when the transducer and control recording are in alignment with each other.

4. An apparatus in accordance with claim 1 wherein, said transducing means includes a transducer operable to scan said control recording, means for relatively moving a document and said transducer at a first rate of travel to permit the scanning of a control recording by the transducer and means operable in response to the signal generated when the transducer scans the control recording for relatively moving the document and said reading means at a higher rate of speed than the movement effected between said reading means and said document in scanning the control recording.

5. An apparatus in accordance with claim 1, wherein said reading means includes a scanning transducer, means for guiding and driving said scanning transducer laterally across said support in a direction normal to the direction in which drive means drives said document, an means for controlling operation of said means driving said transducer and said means for driving documents to permit the transducer to scan information recorded across substantially the entire face of the document.

6. An apparatus in accordance with claim 1 wherein said documents contain plural parallel tracks of recorded information and said control recording is disposed in alignment with the last track or recorded information to be readable by said transducing means whereby the signal generated by said transducing means is operable to control the driving of a document out of operative relationship with said reading means.

7. An apparatus in accordance with claim 1 wherein certain of said documents contain a plurality of control recordings disposed in alignment with respective tracks of information recorded thereon and said means connected to said transducing means includes control signal counting means operative to receive said plurality of signals generated by said transducing means in scanning said plurality of control recordings, said control signals counting means being operable after receiving a plurality of signals generated by said transducing means to control said means for driving said document to move said document out of operative relationship with said reading means.

8. A method of scanning information recorded on cards and generating electrical signals representative of said information comprising: driving and stopping a document such as a card containing multiple tracks of recorded information so as to predeterminately locate said card with respect to a base supporting a scanning means, which scanning means is operable to selectively scan each of said tracks of recorded information, relatively moving said scanning means and said card in a first direction to cause said scanning means to selectively scan information recorded on said card and generating electrical signals of the information so scanned, and each time a track of recorded information has been scanned, relatively moving the card and said scanning means to align the scanning means with a new track of recordings on said card and scanning said new track with said scanning means, and when the last line of recorded information on a card has been read, driving said scanning means to a home location and driving said card out of operative relationship with said scanning means and removing said card from said base.

9. A method in accordance with claim 8 wherein the latter step is initiated by means of a signal generated in scanning a recording on said card.

* * * * *